United States Patent
Nelson et al.

(10) Patent No.: US 7,673,023 B1
(45) Date of Patent: Mar. 2, 2010

(54) METHOD AND APPARATUS FOR SERVICE PROCESSOR UPDATES

(75) Inventors: Kristin K. Nelson, Maplewood, MN (US); W. Michael Rist, Jr., Woodbury, MN (US)

(73) Assignee: Unisys Corporation, Blue Bell, PA (US)

( * ) Notice: Subject to any disclaimer, the term of this patent is extended or adjusted under 35 U.S.C. 154(b) by 643 days.

(21) Appl. No.: 11/647,857

(22) Filed: Dec. 29, 2006

(51) Int. Cl.
*G06F 15/177* (2006.01)

(52) U.S. Cl. .................. 709/221; 709/224; 709/217

(58) Field of Classification Search ......... 709/220–221, 709/223–224, 217–219, 200
See application file for complete search history.

(56) References Cited

U.S. PATENT DOCUMENTS

| | | | |
|---|---|---|---|
| 6,493,871 B1 * | 12/2002 | McGuire et al. ............ 717/173 |
| 6,542,943 B2 * | 4/2003 | Cheng et al. ................ 709/220 |
| 6,842,861 B1 * | 1/2005 | Cox et al. ...................... 726/24 |
| 7,096,368 B2 * | 8/2006 | Kouznetsov et al. .......... 726/24 |
| 7,555,551 B1 * | 6/2009 | McCorkendale et al. ..... 709/225 |
| 2004/0162888 A1 * | 8/2004 | Reasor et al. ................ 709/217 |
| 2005/0210459 A1 * | 9/2005 | Henderson et al. .......... 717/168 |
| 2006/0075001 A1 * | 4/2006 | Canning et al. ............. 707/203 |
| 2007/0101432 A1 * | 5/2007 | Carpenter ..................... 726/25 |
| 2007/0169079 A1 * | 7/2007 | Keller et al. ................. 717/168 |

* cited by examiner

*Primary Examiner*—Philip B Tran
(74) *Attorney, Agent, or Firm*—Robert P. Marley; Beth L. McMahon

(57) ABSTRACT

A service processor computing arrangement is associated with a cellular multiprocessing cell. The arrangement includes a scan machine coupled to communicate with processing hardware of the cell and a service processor coupled to an external communications interface of the scan machine. The scan machine includes remote scan software that performs at least one of monitoring and configuration of the processing hardware, and a first remote install program that receives update data via the external communications interface and applies the update data to the remote scan software. The service processor includes a server control program that performs at least one of monitoring and configuring the cell via the remote scan machine, and a second remote install program that applies the update data to the scan machine via the first remote install program.

20 Claims, 6 Drawing Sheets

METHOD AND APPARATUS FOR SERVICE PROCESSOR UPDATES

FIELD OF THE INVENTION

The present invention relates in general to updating software on data processing arrangements, and in particular to updating hardware controller software in distributed computing arrangements.

BACKGROUND OF THE INVENTION

Cellular multiprocessing (CMP) is a computing architecture developed by Unisys Corporation that may use central processing units (CPUs) developed by Intel Corporation, CPUs that are compatible with those developed by Intel Corporation, proprietary Unisys CPUs, or other CPUs. Some currently available CMP systems may include up to 32 processors that are crossbar connected to up to 512 GB of memory, 512 MB of shared cache, and up to 40 I/O channels. A CMP system provides mainframe-like architecture, yet can support a number of commonly available commercial operating systems (OS), including some server version of Windows™ and some Unix-based and Unix-like operating systems.

A "processing" cell generally refers to a group of processors, memory, and I/O that can be used alone or combined with other cells to form a symmetrical multiprocessing (SMP) system. For example the Unisys ES7000/one server allows users to combine up to eight system cells, each with four Intel Itanium 2 or Xeon processors and 64 GB of main memory for a total of 32 processors and half a terabyte of memory. Each cell contains a CMP crossbar, which connects memory, processors and I/O within the cell. The architecture of Unisys CMP systems is such that cells are often delivered as cell-pairs.

A CMP can be arranged as one large SMP system, or may be partitioned into multiple systems each capable of running a different operating system. For example, a 32 processor CMP can be partitioned into two partitions of 16 processors each, or four partitions of four processors each. These partitions can each have an OS installed, with each OS viewing the partition as a separate machine.

Enterprise CMP servers are often deployed to handle mission-critical computing. As such, these systems include high availability features such as redundant configurations, multiple power domains, resilient I/O configurations, and hot-swappable hardware components. Such systems also employ automated monitoring systems that enable such to be self-monitoring and self-healing. These automated functions dramatically reduce the need for hands-on server management and increase the overall availability.

Generally, system monitoring is provided by a separate processor sometimes referred to as a service processor. This service processor may provide features such as status indicators for notification of system health, quick troubleshooting hardware/software alerts for all monitored servers, and real-time CPU and memory utilization information. The service processor may also apply out-of-band configurations of the target cell, such as by setting/modifying boot time environmental parameters, configuring/reassigning I/O resources, etc. The service processor itself may be considered a high reliability server, although one with a specific role related to maintaining the health of one or more CMP cells.

In order to increase the scalability of CMP machines, some of the service processor functionality has been broken out into a device sometimes referred to as a remote scan machine. A remote scan machine is generally a low-cost, embedded computer that contains the low-level hardware functions needed to directly interface with a CMP cell or cell pair. A service processor works in close cooperation with one or more remote scan machines, and different scan machines may be running different types and versions of the OS.

Because the service processor and remote scan machines are independent computing devices, they typically require periodic updates of software for purposes such as feature upgrades and bug fixes. In previous CMP machines, where the service processor and remote scan machine were one and the same, this meant updating only one machine. However, where such functionality has been segregated between two or more independent hardware components, the work involved in updating software increases by a factor of two or more times. Not only does the service processor itself need updating, but so do all remote scan machines with which the service processor operates.

Therefore, a way of automatically and contemporaneously updating distributed machines such as a service processor and remote scan machine is desirable. Further, this update mechanism should be usable in a heterogeneous computing environment that may utilize different operating systems and processor architectures.

SUMMARY OF THE INVENTION

The present invention is directed to a method and apparatus for updating hardware controller software in distributed computing arrangements. In one embodiment, a service processor computing arrangement is associated with a cellular multi-processing cell and includes a scan machine coupled to communicate with processing hardware of the cell. The scan machine includes an external communications interface and a processor coupled to the external communications interfaces. The scan machine includes remote scan software with instructions that cause the processor to perform at least one of monitoring and configuration of the processing hardware. The scan machine also includes a first remote install program with instructions that cause the processor to receive update data via the external communications interface.

The service processor computing arrangement also includes a service processing machine coupled to the external communications interface of the scan machine. The service processing machine includes a processor and server control software with instructions that cause the processor to perform at least one of monitoring and configuring the cell via the remote scan machine. The service processing machine includes a second remote install program with instructions that cause the processor to send the update data to the scan machine, wherein the update data is applied to the remote scan software via the first remote install program.

In more particular embodiments, the server control program is capable of causing the processor to perform at least one of monitoring and configuring cellular processing hardware via a plurality of remote scan machines, and the second remote install program is capable of causing the processor to update the plurality of scan machines via remote install programs included with the plurality of scan machines. In such a case, at least two of the plurality of scan machines may include different operating systems.

In another more particular embodiment, the first remote install program includes a server and the second remote install program includes a client. In other particular embodiments, the first and second remote install programs utilize a protocol that enables the service processing machine to determine the existence and version of software components installed on a scan machine. In such a configuration, the second remote install program may filter the update data applied to the scan machine based on at least one of a machine type of the scan machine and the existence and version of software components installed on the scan machine.

In another more particular embodiment, the update includes a composite file having a plurality of update files, and the second remote update program extracts the update files and sends the update files to update the scan machine. In such an arrangement, the plurality of update files may include an executable file, and the first remote install program executes the file to apply the update to the remote scan software. In another more particular embodiment, the update includes at least one of an operating system component, a root file system, and a user file system of the scan machine.

In another embodiment of the invention, a method involves coupling a service processor device to one or more scan machines for purposes of at least one of monitoring and configuration of the processing hardware via the one or more scan machines. The scan machines include remote scan software that enables the one or more scan machines to perform at least one of monitoring and configuration of processing hardware of a cellular multiprocessing cell. The method further involves receiving update data for the remote scan software at the service processor device and sending the update data from the service processor device to the scan machine. The remote scan software is updated via the scan machine using the update data.

In more particular embodiments, the one or more scan machines includes a plurality of scan machines, and at least two of the plurality of scan machines include different operating systems. In such a case, the method may further involve selecting a target machine from the plurality of scan machines based on compatibility of the update data with the target machine.

In another more particular embodiment, the method further involves extracting a plurality of update files from the update data via the service processor device. In such a case, sending the update data from the service processor device to the scan machine involves sending the plurality of update files from the service processor device to the scan machine. In these embodiments, extracting the plurality of update files from the update data via the service processor device may further involve filtering the update files via the service processor device based on at least one of the machine type of the scan machine and the existence and version of software components installed on the scan machine. In another more particular embodiment, the plurality of files includes at least one executable file, and updating the remote scan software via the scan machine using the update data involves executing the executable file.

In another embodiment of the invention, a cellular multiprocessing system, includes at least one processing cell having cellular processing hardware that performs the computations of the processing cell. The cell also includes one or more scan machines coupled to communicate with the cellular processing hardware. Each of the one or more scan machines includes remote scan means for performing at least one of monitoring and configuring the cellular processing hardware and install means for receiving and applying updates to the remote scan means. The system also includes a service processor coupled to the one or more scan machines. The service processor includes means for remotely controlling the remote scan means, and means for providing updates to the install means. In a more particular embodiment, the one or more scan machines include a plurality of scan machines, and wherein at least two of the plurality of scan machines include different operating systems.

DETERMINED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

The present invention is generally applicable to Cellular Multiprocessing (CMP) Architectures, and in particular to CMP architectures using a remote scan machine and service processor associated with each cell or cell pair of the CMP hardware. Generally, a system, method, and apparatus are described for updating all of the remote scan machines of a CMP server despite heterogeneous operating systems. Although various embodiments are described in terms of cellular service processors, it will be appreciated that the concepts described herein may be applied to other computing systems known in the art, including stand-alone and/or distributed computing arrangements.

Figure 1:
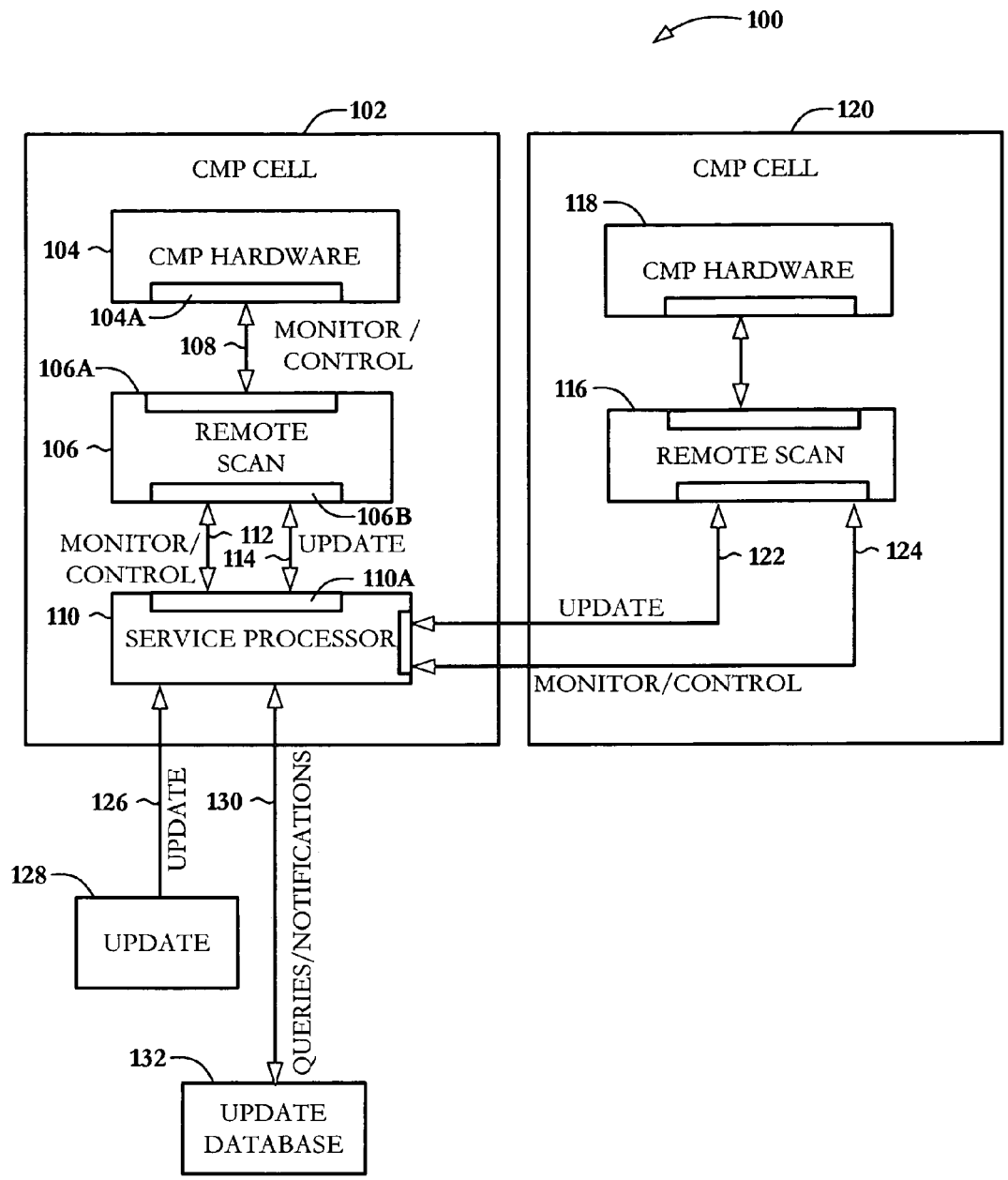
FIG. 1. is a block diagram illustrating a cellular multiprocessing system according to an embodiment of the invention.

In reference now to FIG. 1, a block diagram illustrates a system 100 having software update features according to an embodiment of the invention. The system 100 includes at least one CMP cell 102 that may include enterprise server hardware shown as CMP hardware 104 hosting one or more computing partitions. The CMP hardware 104 may include central processing units (CPU), system cache, system memory, I/O channels, interconnection circuitry (e.g., crossbar controller and fabric), power supplies, etc.

The CMP hardware 104 performs operations as defined by server software, and the present invention is independent of any particular computing application performed by the CMP hardware 104. Further, concepts described herein do not depend on any particular configuration of the CMP hardware 104, including the processor/system architecture, operating systems, or other arrangements that affect the primary processing functions of the hardware 104.

Generally, to ensure that the CMP hardware 104 can remain highly reliable and available, a remote scan machine 106 interacts with the hardware 104, as represented by monitoring and control operations 108. These monitoring/control operations 108 are provided by remote scan software and may include providing boot time environments/parameters, hardware component and OS monitoring, diagnostic data collection, applying automated corrective actions, processor affinity management, and other hardware and low-level software operations known in the art.

The remote scan machine 106 has a CMP hardware interface 106A that communicates with a compatible interface 104A of the CMP hardware 104. Generally, these interfaces 104A, 106A may include the circuitry and logic that allow the remote scan machine 106 to perform either or both of monitor/control operations 108 with the CMP hardware 104.

In some arrangements, different remote scan machines 106 may include different operating systems. For example, the current generations of Unisys™ servers (ES7000™/One™) use at least two types of remote scan machines 106 that may include a Windows-based Remote Scan Control Module (CM) and a Linux-based Remote Scan Baseboard Management Controller (BMC). Although these two types of remote scan machines 106 may have differing operating systems and capabilities, they are all designed to communicate with entities outside the CM cell 102 by way of a service processor 110. In the illustrated embodiment, the service processor 110 is embedded with the cell 102. However, in other arrangements, the service processor 110 may be external to the system cell 102.

The service processor 110 communicates with a remote scan machine 106 for purposes of providing higher-level service functions. These communications may occur over one or more respective data communications interfaces 106B, 110A of the remote scan machine 106 and service processor 110. The higher-level functions of the service processor 110 may involve data gathering/conditioning, system control, and communication with external entities. Example higher level functions of the service processor 110 may include predictive health alerting, anticipatory failover for active-active and active-passive clusters, policy-based management rules and event notification, performance and availability reporting, graphical trending, configurations change analysis, compliance checks, stability reporting to a support center, remote operations, remote service diagnostics, automatic notification of updates, cluster management, etc.

The software on the service processor 110 operates in close cooperation with software running on the remote scan machine 106. This operation is represented by monitor/control communications 112 and update communications 114 that take place between the service processor 110 and remote scan machine 106. As such, the software versions running on the service processor 110 and remote scan machine 106 should be highly compatible, and remain compatible after any software upgrades are applied to one or the other of the units 106, 110. Further, the service processor 110 may communicate with more than one remote scan machine. In the illustrated example, the service processor 110 also is coupled to another scan machine 116 associated with CMP hardware 118 of CMP cell 120. This coupling to the second remote scan machine 116 is represented by respective update communications 122 and monitor/control communications 124.

It will be appreciated that the service processor 110 may be called upon to communicate with any number of remote scan machines 106, 116, and these machines 106, 116 may have heterogeneous operating systems and/or operating software. Therefore, the service processor 110 and remote scan machines 106, 116 contain components that facilitate maintaining this compatibility in response to system updates. System updates are represented by update data 126 being communicated to the service processor 110 from an update entity 128. The update entity 128 may include another computing arrangement that delivers the update data 126 by way of a direct signal path or network. The update entity 128 may also include a computer readable storage medium that is read directly or indirectly by the service processor 110 or other hardware of the CMP cells 102, 120.

In one embodiment, the service processor 110 may receive data that describes the existence of the update, as represented by query/notification data 130 being communicated with an update database 132. The update notification data 130 may be received synchronously (e.g., in response to corresponding query data 130 sent from the service processor 110) or asynchronously (e.g., sent from the update database 132 without any preceding request being sent from the service processor 110). The update database 132 that provides the update signals 130 may be combined with or separate from the update entity 128 that provides the update data 126.

The service processor 110 may perform analysis of the query/notification data 130 in order to determine a target machine from multiple scan machines 106, 116. For example, particular notification data 130 may describe an update for one or the other of the CM-type or BMC type scan machines 106, 116. In such a case, the service processor 110 may ignore those updates if the service processor 110 is not connected to any remote scan machines 106, 116 that are compatible with the update data 130. In other arrangements, the notification data 130 may describe an update that is available in both formats, and therefore the service processor 110 may need to determine whether to download one or more updates depending on the configuration of scan machines 106, 116 coupled to that processor 110. In general, the service processor 110 is updated with both updates in case a remote scan machine of a different type is connected. Other analysis of the notification data 130 may involve checking version/level data contained in the notification data 130. Based on these checks, the update data 114, 122 may be filtered by the service processor 110 as appropriate. For example, if the notification data 130 describes versions older than those already installed on scan machines 106, 116, then the update need not occur unless a rollback to an older version is specifically required.

Figure 2:
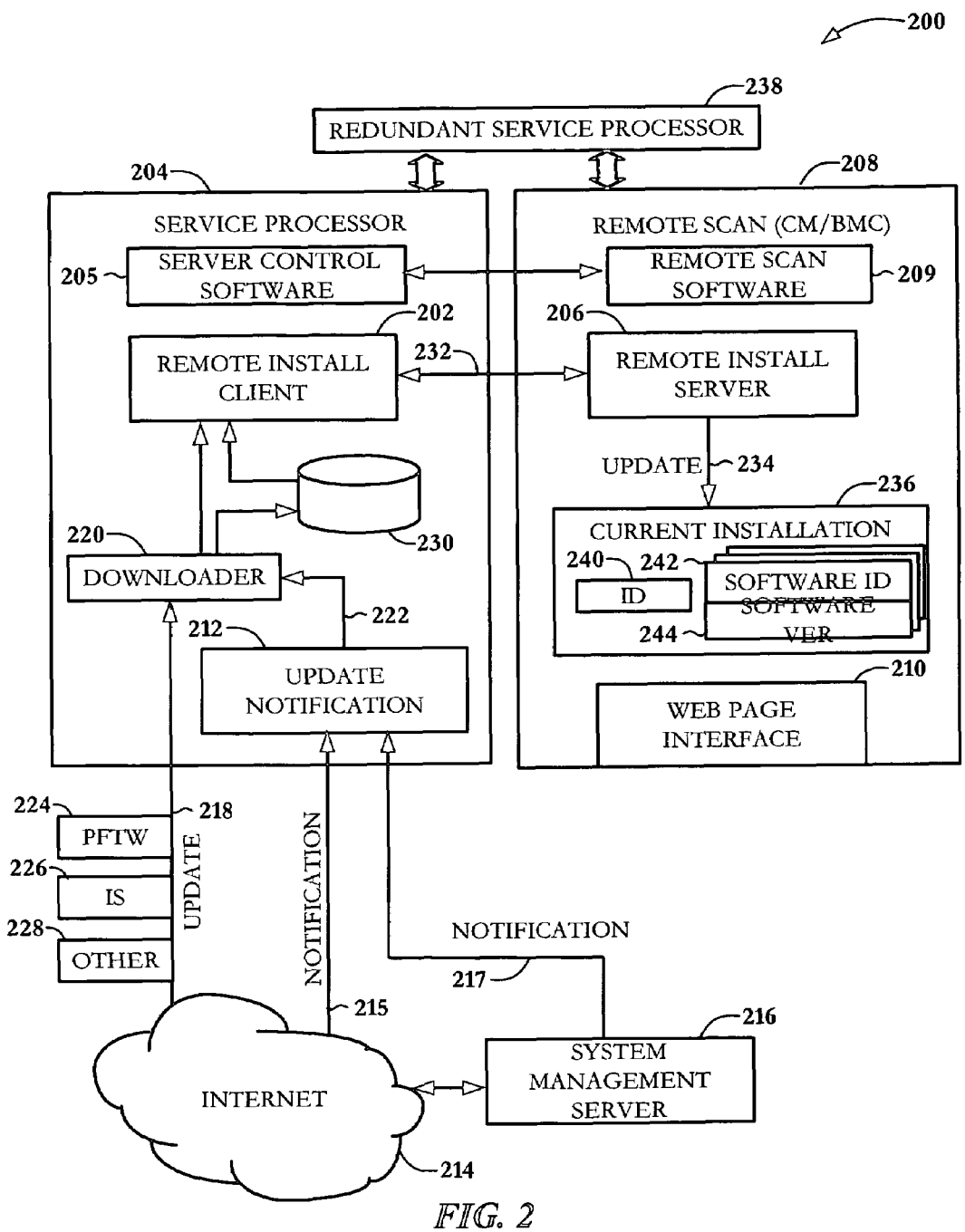
FIG. 2 is a block diagram illustrating a service processing computing arrangement according to an embodiment of the invention.

In reference now to FIG. 2, a software component diagram 200 illustrates components capable of updating software for distributed service processor arrangements according to an embodiment of the invention. As can be seen in the diagram 200, the update components in this example include a remote install client 202 that resides in a service processor 204, and a remote install server 206 that resides in a remote scan arrangement 208. The service processor 204 also contains server control software 205 that interacts with one or more remote scan machines 208 as described hereinabove. Similarly, the remote scan machine 208 includes remote scan software 209 that performs hardware monitoring functions described hereinabove. Generally, the remote install client and server 202, 206 provide a way to verify the levels of software (e.g., software 205, 209) on the devices 204, 208 and to update the software if necessary. The remote install components 202, 206 utilize what will be referred to herein as the remote install service protocol.

The remote install components 202, 206 are designated as "client" and "server" for purposes of illustration. In many applications, it is preferable to configure these components 202, 206 to act as respective clients and servers as the terms are traditionally used in the art. For example, in some embodiments, the existence of updates is discovered first by the service processor device 204, e.g., by signals received from an update entity. Therefore, the client 202 could be started in response to the update signals, and would apply updates to the remote scan machine 208 contemporaneously with those signals. The server 206, on the other hand, would constantly listen for incoming update service requests, because the server 206 would otherwise have no way of knowing when such a request might arrive. However, it will be appreciated that alternate arrangements of the update components 202, 206 may be equally applicable, such as both components 202, 206 being configured to operate as servers. Therefore, the designation of "client" and "server" functionality when describing components 202, 206 is for purpose of illustration and not of limitation.

In current implementations, there are at least two types of remote scan machines 208 that are the target of updates via remote install: a Windows-based Remote Scan CM and a Linux-based remote scan BMC. Besides being updated via the remote scan components 202, 206, the scan machine 208 may also have the ability to be updated manually, such as via a Web page interface 210. Although the service processor 204 may also be running some of the same software packages as the remote scan device 208, the software running on the service processor 204 need not be updated via the remote install components 202, 206. For example, the service processor 204 may be manually updated, and thereafter the service processor 204 proceeds to automatically update the scan machine 208.

The remote installation faculties of the platform 200 may be designed to tie in with update notification software 212. In one configuration, the notification software 212 detects a notification 215 of updates available for products of interest by querying an Internet-based database server at given intervals. In the illustrated implementation, the update notification software 212 runs on the service processor 204, and may require the service processor 204 to have access to external networks such as the Internet 214. In other arrangements, an externally located system management server (SMS) 216 may be responsible for detecting updates and distributing the update notifications 217 to the service processor 204. In some configurations, the SMS 216 may be capable of distributing the updates as well. In such an arrangement, the SMS 216 may be the only computing apparatus required to have Internet access.

The software on the remote scan machine 208 (whether BMC or RSCM) may be structured as a single product suite with multiple separately-updateable components. One function of update notification software 212 may be to notify the registered person of updates, such as via email. In one arrangement, human interaction is required to download the updates to the desired target. However, the remote installation components 202, 206 may also be adapted to systems that are capable of automatically downloading and/or applying changes to the remote scan machine 208 and/or service processor 204 via the service processor 204.

In the illustrated arrangement, the service processor 204 downloads updates 218 (e.g., via the Internet 214) in response to the update notification software 212 detecting an update notification 215, 217. In response, the updates 218 are downloaded to the destination machine, as represented by download component 220. The download may be a manual step, or may be configured as an automatic step, as illustrated by download command 222 sent from the update notification software 212 to the download module 220. In another arrangement, the updates may be retrieved by SMS 216, which then sends the update data to the service processor 204, and possibly to other service processors (not shown).

The update 218 may be packaged for delivery in a single Package for the Web (PFTW) object 224, InstallShield™ (IS) object 226, or any other installation format 228 known in the art. These package files 224, 226, 228 typically contain all updated components, so all components 224, 226, 228 may be downloaded (e.g., to deployment directories 230 in persistent storage) before any are installed. The updates for each specific machine type may be in a separate package, e.g., the updates for the CM are in one package, the updates for the BMC are in a second package, some other machine type would be included in a third package, etc. Where an SMS server 216 is deployed, the download may be performed multiple times—once to the SMS 216 and once to each service processor 204.

Once the updates 218 are downloaded, they are placed in the service processor's deployment directories 230. How that happens depends on what type of updates they are. Updates that are intended for a CM-type of remote scan device 208 may be manually copied to the deployment directory 230 under a RemoteScanControlModule subdirectory. Updates that are intended for a BMC-type of remote scan device 208 may be installed on the service processor 204 in order to extract the updated files that the BMC expects (e.g., .rup files or some other commonly used Linux format) from a Windows-update package file provided via the update notification software 212. It will be appreciated that the present invention is not dependent on any particular format of update packages 218. However for ease of design and use, updates 218 downloaded by the service processor 204 may use a common format regardless of the type of target remote scan machine 208.

The extraction of the update package(s) 218 puts the update files in to the BMC subdirectory of the deployment directory 230. The copy of the CM files and the install of the BMC .msi file may be manual steps that are be taken by the user. They could also be delivered as part of a new plateau (the manually-applied update to the service processor software) in which case the plateau install might take care of those steps. In order to allow the BMC to get software directly from the SMS 212 (or other server), the software updates may be installed on that server 212 in the same way as they are on the service processor 204.

Updates to the remote scan device 208 involve interactions 232 between the remote install client 202 and the remote install server 206. The remote install client software 202 may interact with up to three different services: respective BMC and CM types of scan device 208, and possibly other software components of the service processor 204. The client 202 deploys software at least to the first two, so the service 206 and the protocol it uses to communicate between remote install client 202 and remote install server 206 should be as generic as possible. The remote install client 202 may be limited to deploying software to other machines, and may not be involved in performing the actual install. In such a case, the remote install server 206 may be responsible for installing 234 the updates to the software 236 on its own machine 208 after receiving the updates. In systems that include a master service processor 204 and redundant service processor 238, only the master service processor 204 should attempt to deploy software. To ensure this, the remote install client 202 will be initiated only after the service processor 204 has been determined to be the master.

When it becomes aware of a remote install server 206, the client 202 will send a request for the software versions on that system 208. The remote install server may reply with such data as a machine type identifier 240, as well as the software IDs 242 and software versions 244 on that system 208. The machine type identifier may be a globally unique identifier (GUID) of the product suite, which is utilized in Windows-type installers. The software IDs may also be formed as GUIDs. The client 202 should make no assumptions about the number of IDs 242 or versions 244 it may get back.

The service processor 204 may contain software for more than one type of remote machine 208. The client 202 will use the type of the remote machine 208 to determine what kind of software to deploy. Once the type of the machine 208 is identified, the software IDs 242 and versions 244 will be compared to determine what software is to be deployed.

If the client does not have the software installed that is represented by the software IDs 242, or if the version is different 244 (in particular, if an older version is installed), the new software may be automatically deployed. Once the client 202 has decided what software there is to deploy, it will send a message to the server 206 containing the number and IDs of the software components to update, followed by one or more messages containing the actual update data. The response to the software update will indicate success or failure, plus a description that indicates the reason for the failure. Update status will be logged in the event log of the client machine 204.

The remote install server 206 handles version requests and will receive the deployed software. The server 206 is then responsible for installing it. The install software on the remote machine 208 will make the final determination as to whether and when the software update should be installed. The install package may have knowledge that the software should not be updated at this time (e.g., software is running that should not be interrupted) or at all (e.g., a newer level/version is currently installed and should remain in place).

The remote machine install process should also handle de-installs. For example, a component that was part of the package may no longer be needed or desired, or the entire package may need to be removed. This could be done by including a new component/package that will be deployed and will de-install the components/packages that are targeted for removal.

The BMC and CM versions of the remote scan machine have different operating systems and capabilities. Therefore, the remote installation service 206 on these respective machines will need to take these differences into account. Example features of the BMC and CM types of remote scan machines will be described in more detail below. Those skilled in the art will appreciate that the various configurations of installation services may be abstracted and/or adapted to other types of hardware monitoring devices. As such, the examples presented describing a Linux-based BMC and Windows-based CM are presented for purposes of illustration, not of limitation.

Figure 3:
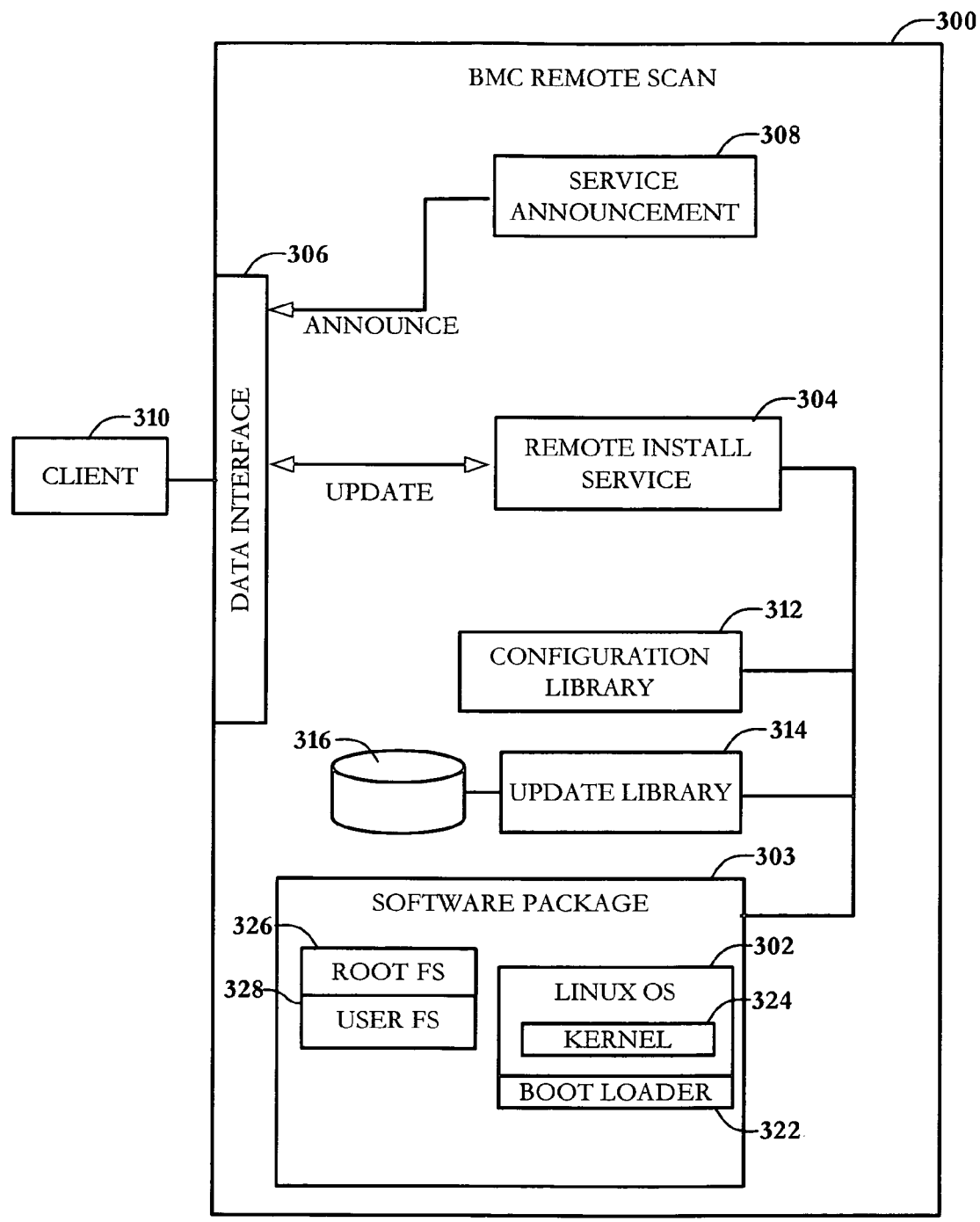
FIG. 3 is a block diagram illustrating a remote scan machine according to an embodiment of the invention.

In reference now to FIG. 3, a BMC remote scan device 300 is illustrated according to an embodiment of the invention. The BMC 300 is generally an embedded control device that utilizes variants of the Linux™ operating system, as represented by Linux OS 302. The BMC 300 includes a software package 303 that is comprised of the boot loader 322, the kernel 324, the root file system 326, and the user file system 328. The boot loader 322 is not usually field updateable. The software components of the package 300 that may be updated as whole units include the kernel 324, the root file system 326, and the user file system 328. The root file system 326 and user file system 328 may also have independently updateable subcomponents.

For the BMC 300 (and CM as well) each separately updateable portion of the package 303 may be represented by a software ID and an associated version. Neither the update client 310 nor the remote install server 304 need have any embedded knowledge of the possible IDs. The installation package for an update can provide the linkage between the software product and the software ID.

Each of the updateable parts of the BMC software is a separate component in the software package 303. The update products may be packaged as a single, composite file for deployment through update notification services (e.g., update notification 212 in FIG. 2). This composite file is capable of containing all of the products in one contiguous file system data structure. The remote installer 304 will typically only deploy the updates that are needed based on versions. The initial delivery of the BMC software 303 can be provided with a plateau installation, but updates can be applied independently.

The BMC 300 includes a remote install server component 304 that receives and applies updates to the remote scan device 300. These updates, and other communications, may occur with a remote install client 310 via a remote data interface 306. The data interface 306 is typically a network interface, although the interface 306 may use other data transfer technologies known in the art, e.g., direct host-to-host data transfer, peripheral I/O bus.

The remote installation service 304 may be announced by service announcement software 308. In one arrangement, this may involve sending an announcement of the remote install service 304 via the data interface 306 when the operating system 302 boots, or when some other software component starts up. The remote installation service 304 may be started upon receipt of a packet intended for the installation service 304. Once the service 304 is started, it handles version requests and receives and installs software updates. A new instance of the remote installation service 304 may spawned for each new connection request.

When a version request comes in, the service 304 sets the machine type identifier to indicate that this device 300 is a BMC, retrieves the software IDs and versions from a configuration library 312 and returns them to the requesting client 310. The client 310 will send a software update request, which will specify the number and software IDs of the components to be updated. This update request is followed by individual updates. If there is an error retrieving any of the updates, all of the updates are preferably discarded.

For each software update received, the service 304 will use an update library 314 to write the update to temporary storage 316, and from the storage 316 perform the install. The library 314 will indicate to the caller if a reboot is required as a result of the installation. If one is needed, the service 304 will arrange for the reboot to be done after all updates are received.

The software updates may be order dependent. For example, any updates to the kernel 324 or the root file system 326 are typically applied before other updates. The update library 314 may have no provision for determining the order in which the updates will be installed. In a typical installation, it may be desirable to provide the remote installation service 304 little or no visibility into the format of the installation file. Further, there is limited space on the BMC 300, so it is preferable to minimize the use of temporary storage space 316. As such, it may be impractical to locally store all updates, and then determine the deployment order. For these reasons, the client 310 preferably controls the order in which the updates are sent.

If an install fails, the service 304 will send a message back to the client 310 indicating what software failed. In a typical scenario, if a component fails to install, the install of any component that depends on it will fail. In such a case, no effort need be made to deinstall any other updates because the install will not be committed, in which case none of the installs will take effect.

Figure 4:
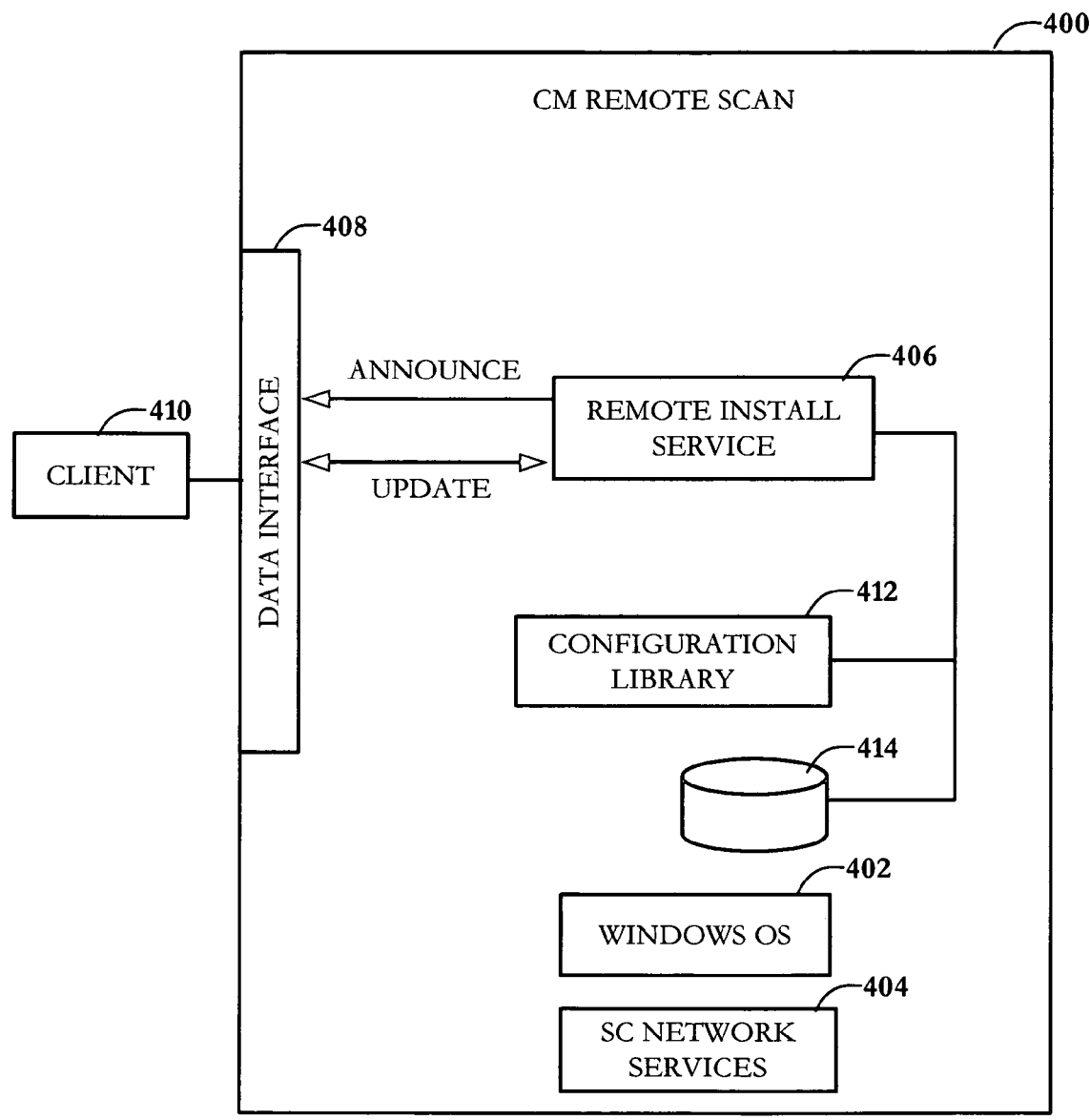
FIG. 4 is a state diagram illustrating an alternate remote scan machine according to an embodiment of the invention.

In reference now to FIG. 4, a CM remote scan device 400 is illustrated according to an embodiment of the invention.

The CM 400 is generally an embedded control device that utilizes variants of the Windows™ operating system, as represented by Windows OS 402. The CM 400 may also include SC Network Services executable 404, a single Windows service that hosts all of the SC .NET services. The CM 400 includes a remote install service 406 that is currently packaged with other .NET services in the SC .NET services 404. The service 406 starts automatically and announces its presence via a data interface 408 when it is started. The service 406 also announces its disappearance when it is stopped.

Once the service 406 is started, it handles version requests from a client 410 and receives and installs software updates. Upon receipt of the version request, the server 406 will get the product IDs and versions for all products related to the CM machine type identifier, which is a GUID product upgrade code for all of the products. This configuration data may be obtained, for example, from a local configuration library 412. The service 406 then returns the information to the client 410. The client 410 will send back a software update request, which will specify the number and software IDs of the components to be updated. This is then followed by individual updates.

If there is an error retrieving any of the updates, that update will be discarded and processing will continue. Each update will be written to a file (e.g., via storage 414) and then installed, and the status will be returned to the client 410. In some arrangements the remote install service 406 is packaged with other services that run on both a CM 400 and a service processor (e.g., service processor 204 in FIG. 2). For example, the client 410 may be in the same package as the remote scan service, and the Windows service will be enabled in both environments.

Figure 5:
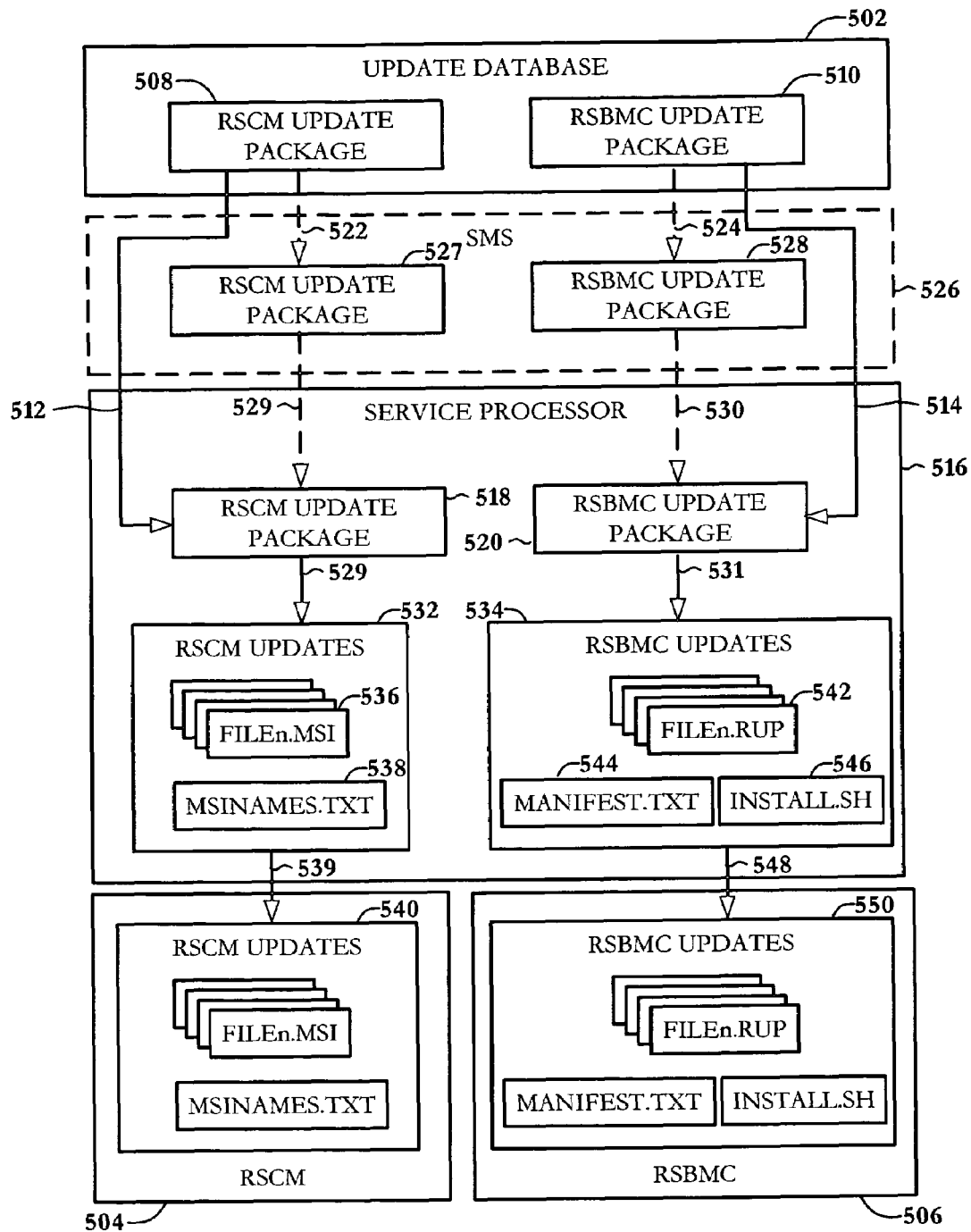
FIG. 5 is a sequence diagram illustrating the transfer of update data according to an embodiment of the invention.

In reference now to FIG. 5, a block diagram illustrates an overview of the install process that may be used for both Windows-based Remote Scan Control Module (RSCM or CM) 504 and a Linux-based Remote Scan Baseboard Management Controller (RSBMC or BMC) scan machine 506. An update database 502 contains install files 508, 510 that are compatible with the respective CM and BMC type remote scan machines 504, 506. As indicated by download paths 512, 514, these files 508, 510 can be downloaded directly to a service processor 516 where they are stored as files 518, 520.

In an alternate arrangement, the package files 508, 510 may instead be downloaded 522, 524 to an SMS 526, which stores the packages locally as files 527, 528. The packages 527, 528 can then be downloaded to the service processor 516, as indicated by paths 529, 530, where they are then stored as files 518, 520 on the service processor 516. The direct or indirect transfer of packages 508, 510 to the service processor 516 generally leave the composition of the files 518, 520, 527, 528, substantially unchanged. However, supplementary operations, such as calculating and comparing a hash or checksum, may be performed on the packages 518, 520, 527, 528 at one or more entities 502, 516, 526 to ensure the integrity of the data.

After the service processor 516 has acquired the files 518, 520, the files 518, 520 can be extracted 529, 531 into individual installation files, as indicated by update collections 532, 534. In one arrangement, the packages 518, 520 are formatted to be compatible with a PFTW program, which performs the extractions 529, 531. It will be appreciated that other package extraction utilities may also be used, including cpio, tar, unzip, etc. The files 518, 520 may be alternately configured as self extracting archives, e.g. an executable file that contains the composite data and extracts 529, 531 the packages 532, 534 when executed.

The RSCM update collection 532 contains one or more MSI files 536, which are Windows-specific files used to install software. MSI files 536 are structured storage files that contain multiple data objects (e.g., files to be extracted) and data that defines the relational hierarchy of those objects. Each of the MSI files 536 may contain a particular update targeted for the RSCM 504. A text file 538 contains a listing of the MSI files 536 and may contain other relevant metadata to help the RSCM 504 apply the install. Some or all of the contents of the RSCM update collection 532 are transferred 539 to the RSCM 504, where the transferred package data 540 is temporarily stored and thereafter installed. The remote install service of the RSCM 504 (see, e.g., service 206 in FIG. 2) generally performs the installation using the temporary files 540.

The RSBMC update collection 534 contains one or more RUP files 542. RUP files 542 are installation data files particularly formatted for use with the RSBMC 506. Each of the RUP files 542 may contain a particular update targeted for the RSBMC 506. In addition, the collection 534 includes a manifest 544 that lists the current RUP files 542 that should be included in the collection 534, as well as an installation script 546 that is executable via the RSBMC 506 for performing the install. Some or all of the contents of the RSBMC update collection 534 are transferred 548 to the RSBMC 506, where collection data 550 is temporarily stored and installed. The remote install service of the RSBMC 506 (see, e.g., service 206 in FIG. 2) generally performs the installation using the temporary files 550.

Figure 6:
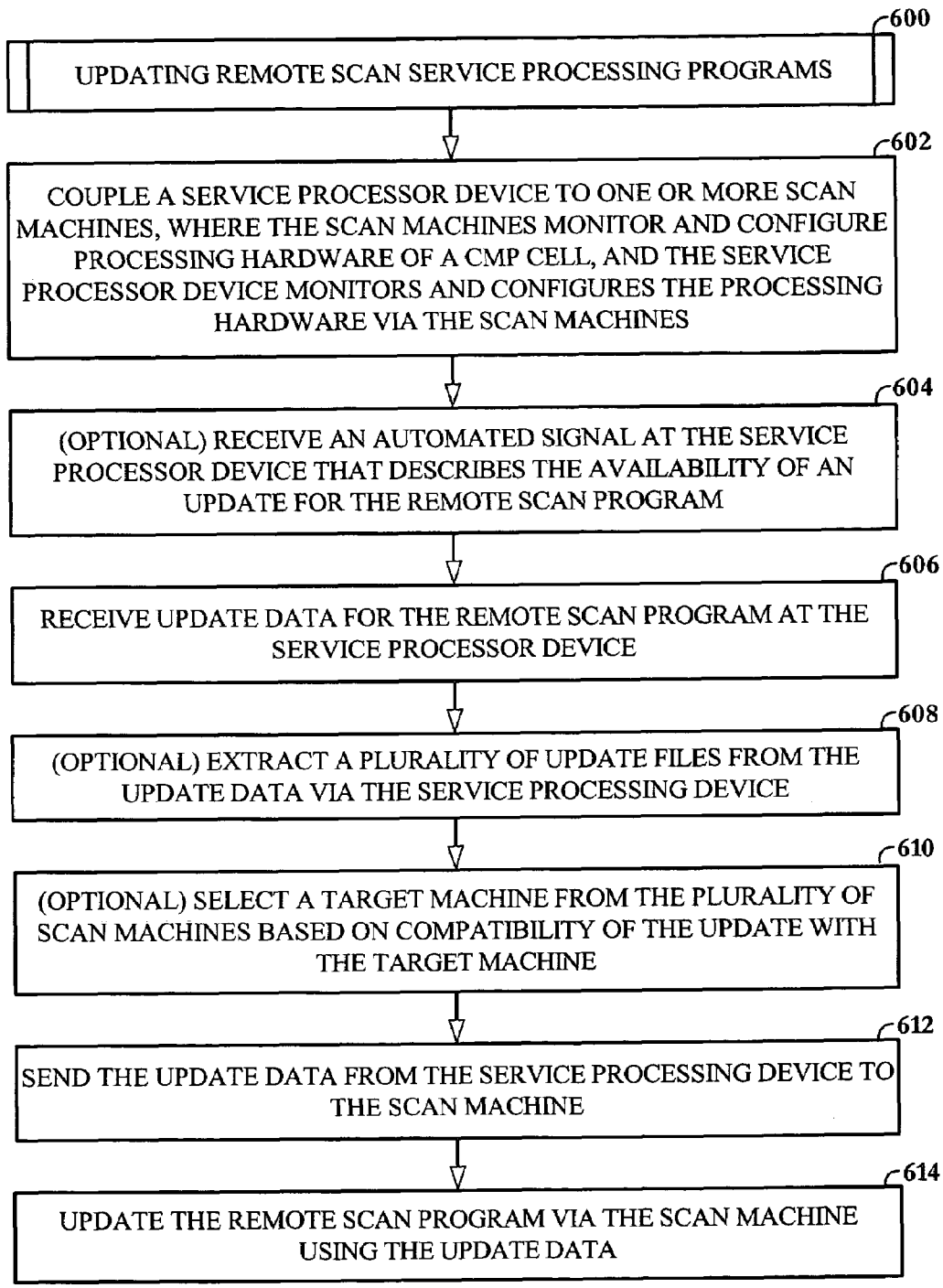
FIG. 6 is a flowchart illustrating a procedure for updating scan machine software according to an embodiment of the invention.

In reference now to FIG. 6, a flowchart illustrates a procedure 600 for updating remote scan software on a remote scan machine according to an embodiment of the invention. A service processor device is coupled 602 to one or more scan machines. The remote scan machine includes remote scan software that enables the scan machines to monitor and configure processing hardware of a CMP cell. The service processor device monitors and configures the processing hardware via the scan machines.

The service processor device optionally receives 604 an automated signal that describes the availability of an update for the remote scan software. The update is then received 606 at the service processor device. A plurality of update files are optionally extracted 608 from the update data via the service processing device. A target machine may optionally be selected 610 from the plurality of scan machines based on compatibility of the update with the target machine (e.g., where scan machines have heterogeneous operating systems). The update data is sent 612 from the service processing device to the scan machine, and the remote scan software is updated 614 via the scan machine using the update data.

Those skilled in the art will recognize that the methods, systems, and apparatuses described herein may be implemented using any combination of hardware and software. For example, some aspects of the invention may be implemented as digital logic circuitry. More typically, the functionality described relating to processor based devices may be implemented as programs that include processor executable instructions and embedded program data. From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out methods embodying the invention.

Any resulting program(s), having computer-readable program code, may be embodied within one or more computer-usable media such as memory devices, thereby making a computer program product or article of manufacture according to the invention. As such, the terms "article of manufacture" and "computer program product" as used herein are intended to encompass a computer program existent on any computer-readable medium, such as on any memory device.

Executing program code directly from one medium, storing program code onto a medium, copying the code from one medium to another medium, transmitting the code using a transmitting device, or other equivalent acts, may involve the use of a tangible memory device. Such memory device may embody program code transitorily or permanently for purposes of making, using, or selling the invention.

Memory devices include, but are not limited to, hard disk drives, diskettes, optical disks, magnetic tape, semiconductor memories such as RAM, ROM, PROMS, flash memory, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims

What is claimed is:

1. A service processor computing arrangement associated with a cellular multiprocessing cell, comprising:
   A) a scan machine coupled to communicate with processing hardware of the cellular multiprocessing cell, the scan machine comprising,
   an external communications interface;
   a first processor coupled to the external communications interfaces;
   remote scan software having instructions that cause the first processor to perform at least one of monitoring and configuration of the processing hardware; and
   a first remote install program having instructions that cause the first processor to receive update data via the external communications interface; and
   B) a service processing machine coupled to the external communications interface of the scan machine, the service processing machine comprising,
   a second processor;
   server control software having instructions that cause the second processor to perform at least one of monitoring and configuring the cellular multiprocessing cell via the scan machine; and
   a second remote install program having instructions that cause the second processor to send the update data to the scan machine, wherein the update data is applied to the remote scan software via the first remote install program.

2. The service processor computing arrangement according to claim 1, wherein the server control software is capable of causing the second processor to perform at least one of monitoring and configuring cellular processing hardware via a plurality of scan machines, and wherein the second remote install program is capable of causing the second processor to update the plurality of scan machines via remote install programs included with the plurality of scan machines.

3. The service processor computing arrangement according to claim 2, wherein at least two of the plurality of scan machines comprise different operating systems.

4. The service processor computing arrangement according to claim 1, wherein the first remote install program comprises a server and wherein the second remote install program comprises a client.

5. The service processor computing arrangement according to claim 1, wherein the first and second remote install programs utilize a protocol that enables the service processing machine to determine the existence and version of software components installed on the scan machine.

6. The service processor computing arrangement according to claim 5, wherein the second remote install program filters the update data applied to the scan machine based on at least one of a machine type of the scan machine and the existence and version of software components installed on the scan machine.

7. The service processor computing arrangement according to claim 1, wherein the update comprises a composite file comprised of a plurality of update files, and wherein the second remote update program extracts the update files and sends the update files to the scan machine.

8. The service processor computing arrangement according to claim 7, wherein the plurality of update files includes an executable file, and wherein the first remote install program executes the executable file to apply the update to the remote scan software.

9. The service processor computing arrangement according to claim 1, wherein the update data comprises at least one of an operating system component, a root file system, and a user file system of the scan machine.

10. A method comprising:
    coupling a service processor device to one or more scan machines for at least one of monitoring and configuration of the processing hardware of a cellular multiprocessing cell via the one or more scan machines, wherein the scan machines include remote scan software that enables the one or more scan machines to perform at least one of monitoring and configuration of processing hardware of a cellular multiprocessing cell;
    receiving update data for the remote scan software at the service processor device;
    sending the update data from the service processor device to at least one of the scan machines; and
    updating the remote scan software via the scan machine using the update data.

11. The method of claim 10, wherein the one or more scan machines comprises a plurality of scan machines, wherein at least two of the plurality of scan machines include different operating systems.

12. The method of claim 11, further comprising selecting from among the plurality of scan machines a target machine to receive the update data based on compatibility of the update data with the target machine.

13. The method of claim 10, further comprising extracting a plurality of update files from the update data via the service processor device, and wherein sending the update data from the service processor device to the scan machine comprises sending the plurality of update files from the service processor device to the scan machine.

14. The method of claim 13, extracting the plurality of update files from the update data via the service processor device further comprises filtering the update files via the service processor device based on at least one of a machine type of the scan machine, an existence of software components installed on the scan machine, and a version of the software components installed on the scan machine.

15. The method of claim 13, wherein the plurality of files includes at least one executable file, and wherein updating the remote scan software via the scan machine using the update data comprises executing the executable file.

16. The method of claim 10, wherein sending the update data from the service processor device to the scan machine comprises sending the update data from a client program operating on the service processor device to a server program operating on the scan machine.

17. A cellular multiprocessing system, comprising:
   at least one processing cell comprising:
      cellular processing hardware that performs the computations of the processing cell;
      one or more scan machines coupled to communicate with the cellular processing hardware, each of the one or more scan machines comprising, remote scan means for performing at least one of monitoring and configuring the cellular processing hardware; and
      install means for receiving and applying updates to the remote scan means; and
   a service processor coupled to the one or more scan machines, the service processor comprising,
      means for remotely controlling the remote scan means; and
      means for providing updates to the install means.

18. The system of claim 17, wherein the one or more scan machines comprise a plurality of scan machines, and wherein at least two of the plurality of scan machines include different operating systems.

19. The system of claim 17, wherein the service processor further comprises means for filtering the updates based on at least one of a machine type of the scan machine and the existence and version of software components installed on the scan machine.

20. A computer-readable medium for storing instructions to cause a data processor that includes a cellular multiprocessing cell to execute a method comprising:
   executing, by one or more scan machines, remote scan software to perform at least one of monitoring and configuring, by one or more scan machines, the processing hardware of the cellular multiprocessing cell;
   receiving update data for the remote scan software at a service processor device;
   sending the update data from the service processor device to at least one of the scan machines; and
   updating the remote scan software via the scan machine using the update data.

* * * * *